(12) United States Patent
Carlson

(10) Patent No.: US 6,186,290 B1
(45) Date of Patent: Feb. 13, 2001

(54) MAGNETORHEOLOGICAL BRAKE WITH INTEGRATED FLYWHEEL

(75) Inventor: J. David Carlson, Cary, NC (US)

(73) Assignee: Lord Corporation, Cary, NC (US)

(*) Notice: Under 35 U.S.C. 154(b), the term of this patent shall be extended for 0 days.

(21) Appl. No.: 08/958,660

(22) Filed: Oct. 29, 1997

(51) Int. Cl.$^7$ .................................................. F16F 15/03
(52) U.S. Cl. ........................................... 188/164; 188/161
(58) Field of Search ............................. 188/267.1, 267.2, 188/161, 164

(56) References Cited

U.S. PATENT DOCUMENTS

| | | | |
|---|---|---|---|
| Re. 34,479 | 12/1993 | Minoura | 482/61 |
| 2,575,360 | 11/1951 | Rabinow | 192/21.5 |
| 2,649,935 | 8/1953 | Tack | 188/33 |
| 2,661,825 | 12/1953 | Winslow | 192/21.5 |
| 2,685,947 | 8/1954 | Votrian | 192/21.5 |
| 2,733,792 | 2/1956 | Saxl | 192/21.5 |
| 3,739,887 | 6/1973 | Ruget | 192/21.5 |
| 3,962,595 | 6/1976 | Eddens | 310/93 |
| 4,090,161 * | 5/1978 | Fuhrer et al. | 188/164 |
| 4,123,675 | 10/1978 | Moskowitz et al. | 310/49 R |
| 4,350,913 | 9/1982 | Eddens | 310/103 |
| 4,853,573 * | 8/1989 | Wolcott et al. | 188/164 |
| 4,974,706 * | 12/1990 | Maji et al. | 188/164 |
| 5,015,926 | 5/1991 | Casler | 318/9 |
| 5,072,930 | 12/1991 | Sun | 272/73 |
| 5,284,330 | 2/1994 | Carlson et al. | 267/140.14 |
| 5,382,373 | 1/1995 | Carslon et al. | 252/62.55 |
| 5,409,435 | 4/1995 | Daniels | 482/5 |
| 5,460,585 | 10/1995 | Gentry et al. | 482/1 |
| 5,492,312 | 2/1996 | Carlson | 267/140.14 |
| 5,547,049 | 8/1996 | Weiss et al. | 188/267 |
| 5,598,908 | 2/1997 | York et al. | 192/21.5 |
| 5,816,372 | 10/1998 | Carlson et al. | 188/267.2 |
| 5,842,547 | 12/1998 | Carlson et al. | 188/267 |
| 5,848,678 | 12/1998 | Johnston et al. | 192/21.5 |
| 5,896,964 | 4/1999 | Johnston et al. | 192/21.5 |
| 5,896,965 | 4/1999 | Gopalswamy et al. | 192/21.5 |

FOREIGN PATENT DOCUMENTS

| | | |
|---|---|---|
| 10 35 419 | 7/1958 | (DE) . |
| 712 908 | 8/1954 | (GB) . |
| 1 226 142 | 3/1971 | (GB) . |

OTHER PUBLICATIONS

Magnetic Power Systems, Inc.'s Brochure re: FASTEP Magnetic Particle Clutches and Brakes.
Warner Electric's Brochure re: Warner Electromagnetic Particle Clutches and Brakes.
Placid Instrusties, Inc.'s Brochure Re: Magnetic Particle Clutches and Brakes.
Rheonetic Magnetic Fluids & System Brochure, Feb. 1997.
Carlson et al., Commercial Magneto–Rheological Fluid Devices, Lord Library of Technical Articles, 1995.
Magnetic Power Systems, Inc.'s Brochure re: Sofstep Magnetic Particle Clutches and Brakes.

* cited by examiner

*Primary Examiner*—Matthew C. Graham
(74) *Attorney, Agent, or Firm*—Randall S. Wayland; Michael M. Gnibus

(57) ABSTRACT

A magnetorheological brake includes an outer, rotating flywheel member having a hollow interior space, and an inner fixed member disposed in the hollow interior space. The inner fixed member is sized so that a working space is provide between the surfaces of the fixed member and the inner wall of the rotating member. A controllable medium of magnetically permeable metal particles is disposed in the working space. A field generator is mounted in the interior space to the fixed member to selectably generate a field acting on the outer and inner members and the controllable medium in the working space. The rheology change in the medium produced by the field generates resistance to rotation of the outer member about the inner member. A device according to the invention may be used as a flywheel/brake or resistance-generating device in exercise equipment, rotating equipment, such as conveyors, and vehicles.

22 Claims, 2 Drawing Sheets

MAGNETORHEOLOGICAL BRAKE WITH INTEGRATED FLYWHEEL

FIELD OF THE INVENTION

The invention relates to the area of braking, resistance generating, and motion control devices. Specifically, it relates to devices employing a controllable medium for motion resistance generation in rotating mechanisms.

BACKGROUND OF THE INVENTION

Magnetorheological (MR) devices for damping and controlling vibration and shock are known. MR devices may be of the "rotary-acting" or "linear-acting" variety, and can advantageously provide variable controlled torques or forces, as the case may be. Known MR devices include linear dampers, rotary brakes, and rotary clutches.

MR fluid devices, for example, typically include a housing or chamber that contains a quantity of magnetically controllable fluid, with a movable member, a piston or rotor, mounted for movement through the fluid in the housing. The housing and the movable member both include a magnetically permeable pole piece. A magnetic field generator (a coil or permanent magnet) produces a magnetic field across both pole pieces for directing the magnetic flux to desired regions of the controllable fluid.

MR fluid devices employ a Magnetorheological (MR) fluid comprised of soft-magnetic particles dispersed within a liquid carrier. Typical particles include carbonyl iron, and the like, having various shapes, but which are preferably spherical and have mean diameters of between about 0.1 $\mu$m to about 500 $\mu$m. The carrier fluids include low viscosity hydraulic oils, and the like. In operation, these MR fluids exhibit a thickening behavior (a rheology change) upon being exposed to a magnetic field. The higher the magnetic field strength in the fluid, the higher the damping/restraining force or torque that can be achieved within the MR device.

MR fluid devices are disclosed in U.S. patent application Ser. No. 08/304,005 entitled "Magnetorheological Fluid Devices And Process Of Controlling Force In Exercise Equipment Utilizing Same", U.S. patent application Ser. No. 08/613,704 entitled "Portable Controllable Fluid Rehabilitation Devices", U.S. application Ser. No. 08/674,371 entitled "Controllable Brake", U.S. patent application Ser. No. 08/674,179 entitled "Controllable Vibration Apparatus" and U.S. Pat. Nos. 5,547,049, 5,492,312, 5,398,917, 5,284,330, and 5,277,281, all of which are commonly assigned to the assignee of the present invention.

U.S. Pat. No. 3,962,595 to Eddens discloses a "Magnetic Particle Brake", commonly referred to as "Dry Particle Brakes" that includes a rotating member that is disposed in an annular space in a stationary member. A field-generating coil is mounted in an outer part of the stationary member. Magnetic particles are disposed in a space between the inner part of the stationary member and the rotating member. Other magnetic particle brakes are disclosed in U.S. Pat. No. 4,350,913 to Eddens and U.S. Pat. No. 4,575,103 to Pedu.

Exercise machines such as stationary bicycles, rowers, stair climbers, and ski machines, typically rely on some kind of resistance generating device to provide adjustable resistance to the exercise movements of the user. Conventional resistance systems used in exercise machines, for example, friction devices, have deficiencies in providing reliable control of the resistance setting and in duration over repeated use of the machine. Before the present invention, however, there has been no resistance device for exercise machines using MR technology to replace conventional resistance devices and provide improved performance, reliability and endurance characteristics.

The foregoing illustrates limitations known to existing present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

The present invention provides a Magnetorheological (MR) device which combines a rotary brake with a flywheel thereby providing both resistance and rotational inertia, and can be used in an exercise apparatus and/or as a brake for rotating equipment and vehicles.

According to a preferred embodiment of the invention, a rotary brake device comprises an outer rotating member having a hollow interior space and an inner stationary member disposed in the hollow space. The rotating member, or rotor, rotates around the stationary member, or stator, an arrangement contrary to conventional practice. The stator is sized so that a small working space exists between the inner wall of the rotor and the peripheral surface(s) of the stator. The stator supports a field generating device, preferably a magnetic field producing coil. A controllable medium (a MR fluid or dry powder) is disposed in the working space so that the medium can be acted upon by the field generating device. In addition, each of the rotor and the stator is made to include a magnetically permeable portion that acts as a pole piece. Rotation of the rotor distributes the controllable medium about the inner circumference of the rotor.

Thus, according to the invention, resistance to rotation can be generated and preferably controlled by applying a magnetic field to the pole pieces and to the controllable medium in the working space. The field causes the controllable medium to thicken (a rheology change), which produces the resistance to rotation of the rotor relative to the stator.

The inventor has discovered that a controllable medium of dry powder of magnetically permeable material, such as carbonyl iron, provides a significantly high resistance force. A controllable medium formed of 410 stainless steel powder of 325 mesh particles (less than 45 microns in diameter) has been found to be particularly effective in a brake according to the invention, and has endured a test program of sixteen million cycles without failure.

The controllable medium optionally can be formed of soft-magnetic material particles included in a low-viscosity carrier of hydraulic oil.

The flywheel resistance device of the invention can be incorporated in exercise devices, such as bicycles, rowing machines, step machines, and ski machines to provide controllable, variable resistance, or in other devices/apparatus where it is desirable to have combinations of rotational inertia and resistance.

Alternatively, a device in accordance with the invention may be formed as a stationary shaft disposed in a tubular outer member, which may be useful as a brake for a conveyor system or a resistance device for a ski machine, for example.

The above-mentioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF PREFERRED EMBODIMENTS

Figure 1:
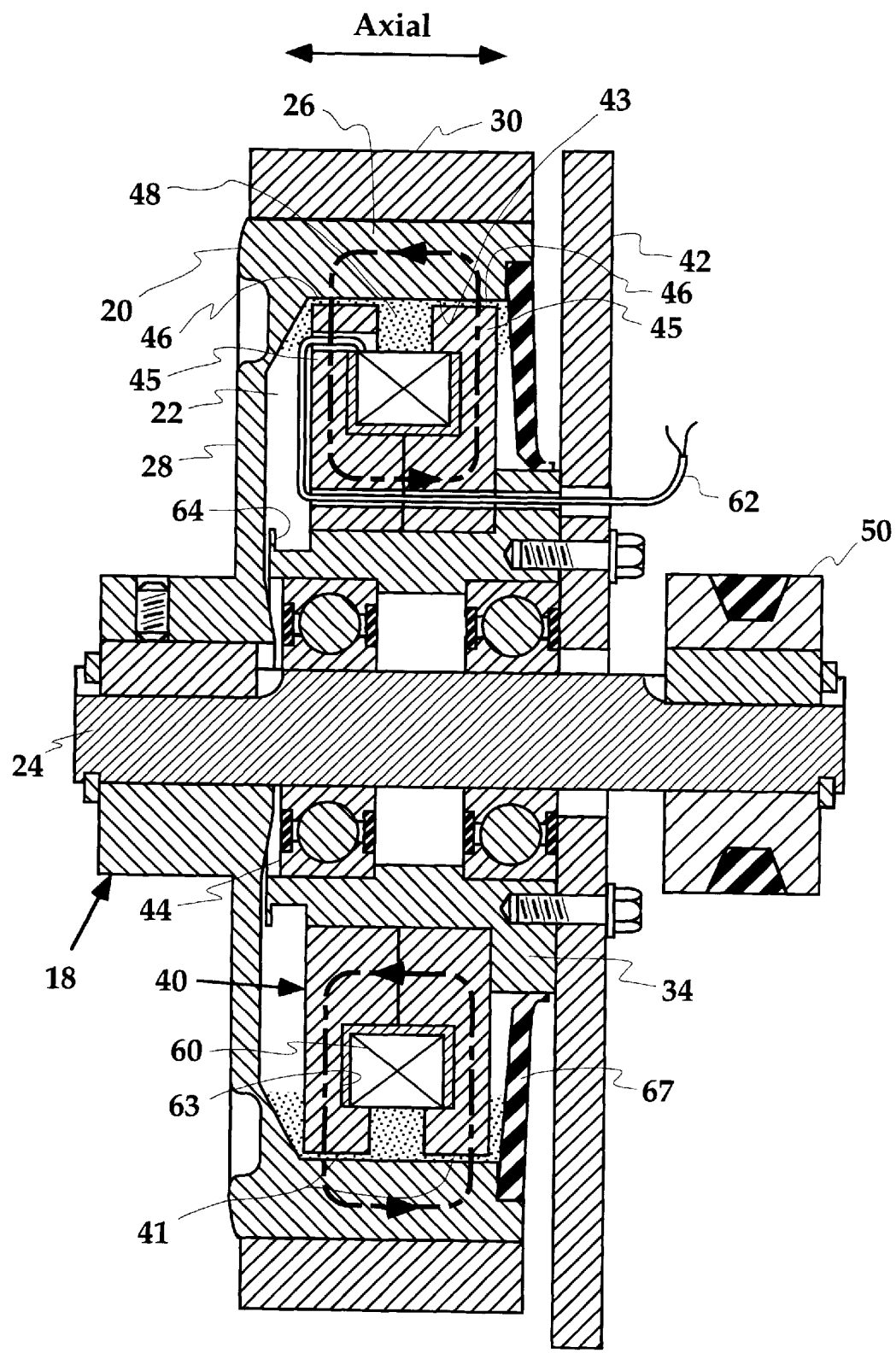
FIG. 1 is a side sectional view of a brake with an integrated flywheel in accordance with the invention.

Referring now to the Drawings where like numerals denote like elements, FIG. 1 illustrates a brake device 18 according to the invention integrating a flywheel with a magnetorheological brake mechanism. The device 18 includes a flywheel body 20 having a substantially circular profile, which is mounted on a shaft 24 for rotation. The flywheel body 20 includes a radially outward peripheral wall 26, a radially extending side wall 28, and a seal 67 that cooperate to define an interior space 22. The flywheel body 20 has a rotational inertial mass distribution sufficient to act as a flywheel to store energy when set in rotational motion. By way of example, and not to be considered limiting, a rotational inertia greater than about 0.01 KgM² has been determined by the inventor to provide the appropriate feel when applying moderate resistance to the brake 18, such as would be experienced during use within an exercise machine such as a stationary bike. Additional mass may be added to increase the inertial mass of the flywheel body 20, for example, in the form of an annular ring 30 attached to the radially outer wall 26 as shown in FIG. 1.

A stationary member, or stator 40, is disposed in the interior space 22 of the flywheel body 20 and is mounted to a hub 34 which is connected to a support structure 42, for example, a frame of an exercise machine. The hub 34 includes sealed bearings 44 mounted therein which support the shaft 24 which passes through the hub 34. The shaft 24 includes a coupling 50 to interconnect it to a drive source (not illustrated in FIG. 1), for example, a pedal apparatus, steps on a stair stepper, rollers on a ski machine. Preferably, the drive train interconnected to coupling 50 will include a one-way clutch mechanism. Optionally, the one-way clutch may be integrated into the coupling 50. The stator 40 is sized so that one or more working spaces 46 are provided between the outer, peripheral surfaces 41 of the stator 40 and the inner wall 43 of the flywheel body 20. Thus, as may be understood, the flywheel body 20 surrounds and rotates about the stator 40.

According to the invention, a controllable medium 48 is disposed in the working space(s) 46 and the device 18 includes field generating means 60 for generating a magnetic field that acts between the flywheel body 20 and the stator 40 and on the working space(s) 46. By activating the field generating means 60, a change in the rheology of the controllable medium 48 is effected, the controllable medium becoming increasing "thick" in response to increasing field strength. The controllable medium 48 therefore can be controlled to provide selectable resistance to rotation of the flywheel body 20 about the stator 40.

In the illustrated embodiment, the field generating means 60 comprises a magnetic field coil mounted to the stator 40, and connected to an external controller and power source by wires 62. The stator 40 is formed with pole piece halves 45 which cooperate to form an annular groove 63 to accommodate the coil 60. In FIG. 1, the stator 40 is illustrated as being shaped similar to a tire rim to provide the groove 63. Alternatively, the field generating means 60 may be a ring magnet mounted to the stator 40 in a manner similar to the coil 60 to provide a continuous resistance brake. Other orientations of mounting coils and/or magnets would be apparent.

Both the stator 40 and the flywheel body 20 include magnetically permeable (i.e., soft magnetic) material, such as low carbon steel, to provide pole pieces for the field generating means 60. The stator 40 and the flywheel body 20 may both be made entirely of a magnetically permeable material. Alternatively, the magnetically permeable material may be included in portions of the stator 40 and the flywheel body 20 which are to be acted upon by the field generating means 60. Preferably, the hub is made from aluminum or another nonmagnetic material.

The inventor has found that a dry powder of stainless steel provides an advantageous controllable medium 48. Preferably, the controllable medium is a powder of water atomized 410 stainless steel of 325 mesh (approximately 45 microns or smaller particle size). The powder medium is disposed in the working space(s) 46. Rotation of the flywheel body 20 readily distributes the powder throughout the working space(s) 46 adjacent to the inner periphery 43 of the radially peripheral wall 26.

The controllable medium 48 may alternatively be formed as a suspension of magnetically soft particles in a liquid carrier, as disclosed in, for example, U.S. Pat. Nos. 5,382,373 and 5,578,238.

A skirt 64 is mounted on flywheel body 20 opposite the side wall 28 to help prevent the controllable medium 48 from packing near the bearings 44. In addition, an elastomeric or plastic seal 67 is formed on (preferably pressed into) the hub 34 to seal the interior space 22 of the flywheel body 20 and prevent escape of the medium 48.

In performance testing, a flywheel brake 18 as described using a dry powder medium has achieved in excess of 16 million cycles rotating under constant applied current. The longevity is at least partially attributed to the rotation of the flywheel body 20 which provides a heat sink mass to cool the medium 48 in the working space(s) 46. Being the outward positioned body, heat in the flywheel body 20 is readily transferred to the environment. Fins or other cooling mechanisms could be placed on the flywheel body 20.

The flywheel brake 18 is most advantageous for use in exercise equipment. The high rotary inertia of a flywheel 20 imparts smoothness to the moving parts of the equipment. The resistance generated by the brake 18 simulates resistance encountered in the real-life equivalent to the exercise machine. For example, in a stationary bicycle, where exertion of the user in pedaling turns the flywheel, rotational inertia of the flywheel approximates the feeling of pedaling a bicycle up to speed and maintaining it in motion. Continuing with the exercise bicycle example, brake resistance simulates rolling friction, air resistance, and gravity (when climbing a hill). The flywheel brake 18 may also be used as a brake in rotating equipment or in vehicles where combinations of rotary inertia and variable resistance are needed. Other uses will occur to those skilled in the art.

Figure 2:
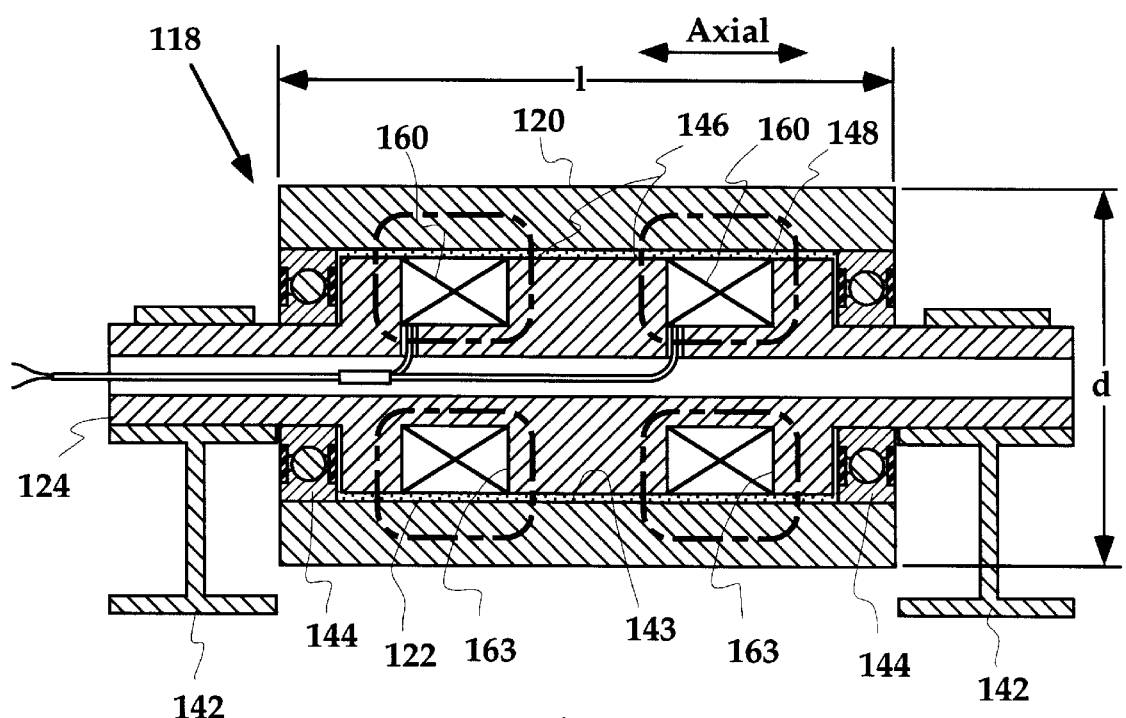
FIG. 2 is a side sectional view of a roller embodiment in accordance with the invention.

FIG. 2 illustrates an embodiment of the magnetorheological brake 118 with an integrated flywheel 120 in which a roller, for example, a conveyor or exercise machine roller, is the rotating body. The flywheel roller 120 is formed as a tube, having a length l that is greater than its diameter d, and having a hollow interior space 122. The mass of the flywheel roller 120 may be selected to provide a rotational inertial mass sufficient for storing rotational energy. A fixed supporting shaft 124 is disposed in the interior space of the roller 120 and is sized so that a working space(s) 146 is provided between the shaft 124 and an inner surface 143 of the flywheel roller 120. Ball bearings 144 support the roller

120 for rotation about the shaft 124. The shaft 124 is mounted to the conveyor frame 142 or other like frame member, such as a bicycle trainer frame or ski machine frame.

Field generating means are carried/mounted on the shaft 124. The shaft 124 includes two circumferential grooves 163 in which are mounted coils 160 for generating fields to act between the shaft 124 and the roller 120 and on the working space(s) 146, the magnetic flux being carried in the shaft 124 and roller 120. Of course, depending on the length of the shaft 124 and the roller 120, and the desired braking force, the field generating means may be suitably adapted, for example, to include one coil for a short shaft, or a plurality of coils for a long device. A controllable medium 148, such as a dry powder or MR fluid, is disposed in the working space 146.

The fields generated by the coils 160 act on the shaft 124, roller 120 and controllable medium 148 and create resistance to rotation of the roller 120. The roller brake 118 can be used in conveyer systems or other similar applications. A roller brake 118 can also be used as a resistance generating device in exercise equipment where the user's movements act to move the roller 120, as in ski machines, and rollers for bicycles. In the case of the ski machine, one or more rollers 120 would be disposed under, and in contact with, the ski for rotation upon skiing movements by the user. In the rollers for bicycles application, one or more of the rollers 120 would be positioned to contact a bicycle wheel.

In summary, it should be apparent from the foregoing that the present invention comprises a novel controllable device that combines a rotational energy storing flywheel with an integrated brake that can be used in a variety of applications. The invention also provides a novel controllable medium, a dry powder of soft-magnetic particles or MR fluid that provides superior performance and endurance in a flywheel brake device as described.

While several embodiments including the preferred embodiment of the present invention have been described in detail, various modifications, alterations, changes, and adaptations to the aforementioned may be made without departing from the scope of the present invention defined in the appended claims. It is intended that all such modifications, alterations, and changes be considered part of the present invention.

I claim:

1. A controllable brake, comprising:
    a rotatable outer member having a hollow interior space and also having a rotational inertia, the rotatable outer member including means for altering the rotational inertia of the rotatable outer member;
    a stationary inner member disposed in the hollow interior space of the rotatable member with a working space between a surface of the stationary member and a wall of the rotatable member, the stationary member defining a recess along the interior of the inner member;
    selectable field generating means mounted in said stationary inner member recess and within said hollow interior space for producing a controllably variable field to act selectably between said rotatable outer member and said stationary inner member and on said working space; and
    a controllable medium contained within said working space which has a rheology variably responsive to changes in the controllably variable field for controllably resisting rotation of the rotatable outer member about the stationary inner member.

2. The controllable brake of claim 1, wherein the controllable medium comprises a powder of magnetically permeable material.

3. The controllable brake of claim 1, wherein the controllable medium comprises a fluid of soft-magnetic particles dispersed in a fluid carrier.

4. The controllable brake of claim 1, wherein said stationary member has a circular profile, and wherein said controllable medium is disposed between radially outer portions of the stationary member and an inner surface of the rotatable member.

5. The controllable brake of claim 4, wherein said stationary member recess is an annular groove.

6. The controllable brake of claim 1, wherein the inner member is a shaft and the outer member is tubular shaped having a length greater than a diameter, and the controllable medium is disposed between an outer surface of the shaft and an inner surface of the tubular shaped member.

7. The controllable brake of claim 1, wherein said rotational inertia is greater than 0.01 $KgM^2$.

8. The controllable brake of claim 1, wherein said means for producing a field includes at least one coil.

9. The controllable brake of claim 1, wherein said magnetic field generator is a permanent magnet.

10. A controllable brake of claim 1 in combination with an exercise machine having a frame and a movable member which is movable relative to the frame through exertion of a user, wherein the stationary inner member is connected to the frame and the rotatable outer member is connected to the movable member.

11. The controllable brake as claimed in claim 1 wherein the rotatable outer member includes an integral skirt located in the hollow interior space for preventing packing of the controllable medium in the hollow interior space.

12. The controllable brake as claimed in claim 1 wherein the rotatable member includes a hub and a seal located in the hub to seal the hollow interior space and prevent escape of the controllable medium.

13. The controllable brake as claimed in claim 1 further comprising: a first pole piece fixed to said inner stationary member, a second pole piece fixed to said stationary member, the first and second pole pieces defining a groove shaped to receive the selectable field generating means.

14. The controllable brake as claimed in claim 1 further comprising: first and second pole pieces fixed to said inner stationary member, the first and second pole pieces defining a groove shaped to receive the selectable field generating means, the pole pieces and rotatable outer member defining working spaces, the controllable medium being disposed in the working spaces.

15. The controllable brake as claimed in claim 14 wherein the pole pieces and selectable field generating means are annular.

16. A controllable brake adapted for attachment to a machine frame, comprising:
    (a) a stationary inner member mounted to the machine frame, said stationary inner member having an outer radially peripheral surface, and at least one annular recess;
    (b) a rotatable outer member having an interior hollow space and an inner radial peripheral surface, said inner radial peripheral surface surrounding said outer radially peripheral surface of said stationary inner member and forming therewith first and second axially extending working gaps;
    (c) a plurality of bearings supporting said rotatable outer member relative to said stationary inner member and maintaining a width of said axially extending working gaps; and
    (d) at least one coil mounted in the at least one annular recess of said stationary inner member and located within said interior hollow space for generating a controllably variable magnetic flux which acts upon said axially extending working gaps.

17. A controllable brake of claim 16, wherein said magnetic flux path crosses a first of said axially extending working gaps, is carried axially across said rotatable outer member and then crosses a second of said axially extending working gaps.

18. A controllable brake of claim 16, wherein said plurality of bearings are mounted to said stationary inner member.

19. A controllable brake of claim 16, wherein said plurality of bearings are mounted between said inner member and a shaft which interconnects to said rotatable outer member.

20. A controllable brake of claim 16, wherein said at least one coil further comprises a first coil mounted in a first annular recess in said inner member and a second coil mounted in a second annular recess spaced axially from said first annular recess.

21. The controllable brake as claimed in claim 11 wherein the outer rotatable member includes means for adjusting the rotational inertia of the outer rotatable member.

22. The controllable brake as claimed in claim 21 wherein the means for adjusting the rotational inertia of the outer rotatable member is a ring attached to the outer radially peripheral surface.

* * * * *